United States Patent
Goel

(10) Patent No.: US 8,428,145 B2
(45) Date of Patent: Apr. 23, 2013

(54) SYSTEM AND METHOD FOR PROVIDING FAST TRICK MODES

(75) Inventor: Anurag Goel, Panchkula (IN)

(73) Assignee: Entropic Communications, Inc., San Diego, CA (US)

( * ) Notice: Subject to any disclaimer, the term of this patent is extended or adjusted under 35 U.S.C. 154(b) by 972 days.

(21) Appl. No.: 12/346,910

(22) Filed: Dec. 31, 2008

(65) Prior Publication Data

US 2010/0166079 A1    Jul. 1, 2010

(51) Int. Cl.
*H04N 7/12* (2006.01)

(52) U.S. Cl.
USPC ................................ 375/240.25

(58) Field of Classification Search .............. 375/240.25
See application file for complete search history.

(56) References Cited

U.S. PATENT DOCUMENTS

| | | | |
|---|---|---|---|
| 5,726,711 A | 3/1998 | Boyce | |
| 6,028,648 A * | 2/2000 | Yu | 375/240.27 |
| 2004/0136596 A1* | 7/2004 | Oneda et al. | 382/232 |
| 2007/0030911 A1* | 2/2007 | Yoon | 375/240.25 |
| 2007/0104278 A1 | 5/2007 | Kikuchi | |

FOREIGN PATENT DOCUMENTS

| | | |
|---|---|---|
| EP | 1802126 | 6/2005 |
| EP | 1553779 | 7/2005 |

* cited by examiner

*Primary Examiner* — Richard Torrente

(74) *Attorney, Agent, or Firm* — Bruce Greenhaus; Richard Bachand; Duane Morris LLP

(57) ABSTRACT

A system and method for providing trick modes uses one or more techniques to reduce computation and/or memory requirements to efficiently decode frames of a video bitstream to be displayed during a selected trick mode.

14 Claims, 4 Drawing Sheets

FIG. 2

SYSTEM AND METHOD FOR PROVIDING FAST TRICK MODES

Personal video recorders (PVRs) are devices that allow video bitstreams to be recorded on a storage medium, such as a computer hard drive, which can be played at anytime by users. Users of PVRs are generally interested in browsing/seeking through the supplied content in various ways, such as fast forward, rewind, pause, freeze, frame stepping etc. These different browsing/seeking modes are commonly referred to as trick modes. Trick modes are important features for multimedia consumers, and thus, providing an efficient quality trick mode solution is of great commercial importance to set-top box manufacturers and service providers.

Trick modes, such as high speed fast forward and rewind, are generally implemented by decoding frames of the video bitstream at a higher rate followed by displaying uniformly (approximately) sampled decoded frames. However, depending on group of pictures (GOP) structure and/or the complexity of the encoded video bitstream, the video frames cannot always be decoded at a higher rate.

Large GOP sizes with relatively few non-reference frames, such as B frames (bidirectional coded frames), are challenging for both fast forward and rewind. For such GOPs, almost all the frames have to be decoded to provide good quality fast forward and rewind. Video bitstreams are forward coded, and hence, rewind is generally implemented by decoding a GOP in forward direction and then displaying the decoded frames in reverse direction. For large GOPs, the decoded frames of the GOP have to be stored, which requires large memory. If the memory is limited, then the frames which get thrown away due to the limited memory have to be re-decoded. This requires a decoder to operate at a much higher speed, which may exceed the decoding speed of the decoder. Also, the same frames may have to be decoded again and again, resulting in wastage of time and power.

The decoding speed of a decoder is dependent on the complexity of the encoded video bitstream being decoded. The complexity of an encoded video bitstream is largely related to video coding standard and video encoding. The latest video coding standard, i.e., H.264, is capable of compressing videos at half the file size at same video quality as compared to its predecessor video coding standard, i.e., MPEG4 (Motion Picture Experts Group 4). However, this comes at an increased computational cost of decoding video content due to the predictive coding used in H.264 codecs.

Predictive coding used in video codecs makes trick modes a computationally intensive feature. Predictive coding strictly ties the decoding of a current frame to previously decoded frames. Thus, almost all the frames have to be decoded even if only a few frames need to be displayed. Due to the computationally intensive decoding of high definition H.264 bitstreams, it is a challenge to provide a good quality trick mode solution for these bitstreams within the available computation budget. Decoding complexity of B frames is generally higher than other frame types. Moreover, B frames are allowed to be reference frames in H.264 video coding standard, and hence, B frames cannot be skipped if these frames are chosen to be the reference frames for decoding future frames. Since decoding complexity limits the decoding frame rate, the decoding complexity also limits high speed trick mode features, such as high speed fast forward and rewind.

When frames cannot be decoded at the required higher rate, one possible solution is to display only anchor frames or I frames (intra coded frames), which are present relatively sparsely in a bitstream, e.g., only once in approximately thirty frames. If the speeds chosen by the user are not an integer multiple of occurrence rate of anchor frames, then the user may experience unpleasing effects of decoded video content presented to the user not being smooth and appearing jumpy. If only anchor frames are displayed during a trick mode, then the displayed content may be observed as same at different trick mode speeds, giving an experience of same speed even when the user has chosen different trick mode speeds, or the user may experience the trick mode speed as varying as the occurrence rate of I frames and rate of video content change.

In view of the above concerns, there is a need for a system and method for providing trick modes that addresses these concerns.

A system and method for providing trick modes uses one or more techniques to reduce computation and/or memory requirements to efficiently decode frames of a video bitstream to be displayed during a selected trick mode. Thus, video frames of the bitstream can be displayed at a proper display rate during the selected trick mode.

A method for providing trick modes in accordance with an embodiment of the invention comprises determining particular frames of a video bitstream that can be skipped to achieve a desired speed of a selected trick mode, selecting specific macroblocks of the particular frames that will not be referred to during decoding of frames of the video bitstream that will be displayed during the selected trick mode, and decoding macroblocks of the particular frames without decoding the specific macroblocks of the particular frames to decode the frames of the video bitstream that will be displayed during the selected trick mode.

A system for providing trick modes in accordance with an embodiment of the invention comprises a storage device to store a video bitstream, and a decoder unit connected to the storage device to receive and process the video bitstream to decode the video bitstream to produce frames to be displayed. The decoder unit includes a non-reference macroblock selector configured to determine particular frames of the video bitstream that can be skipped to achieve a desired speed of a selected trick mode. The non-reference macroblock selector is further configured to select specific macroblocks of the particular frames that will not be referred to during decoding of the frames of the video bitstream that will be displayed during the selected trick mode. The decoding unit is configured to decode macroblocks of the particular frames without decoding the specific macroblocks of the particular frames to decode the frames of the video bitstream that will be displayed during the selected trick mode A method for providing trick modes in accordance with another embodiment of the invention comprises receiving a video bitstream to be decoded to display frames of the video bitstream for a selected trick mode, the video bitstream including groups of pictures, and converting a particular group of pictures of the video bitstream into one or more sub-groups of pictures at least partly based on the size of the group of pictures, wherein each of the sub-groups of pictures includes fewer frames than the particular group of pictures.

Other aspects and advantages of the present invention will become apparent from the following detailed description, taken in conjunction with the accompanying drawings, illustrated by way of example of the principles of the invention.

FIG. 2 illustrates an example of a macroblock map used in the system of FIG. 1 in accordance with an embodiment of the invention.

Figure 1:
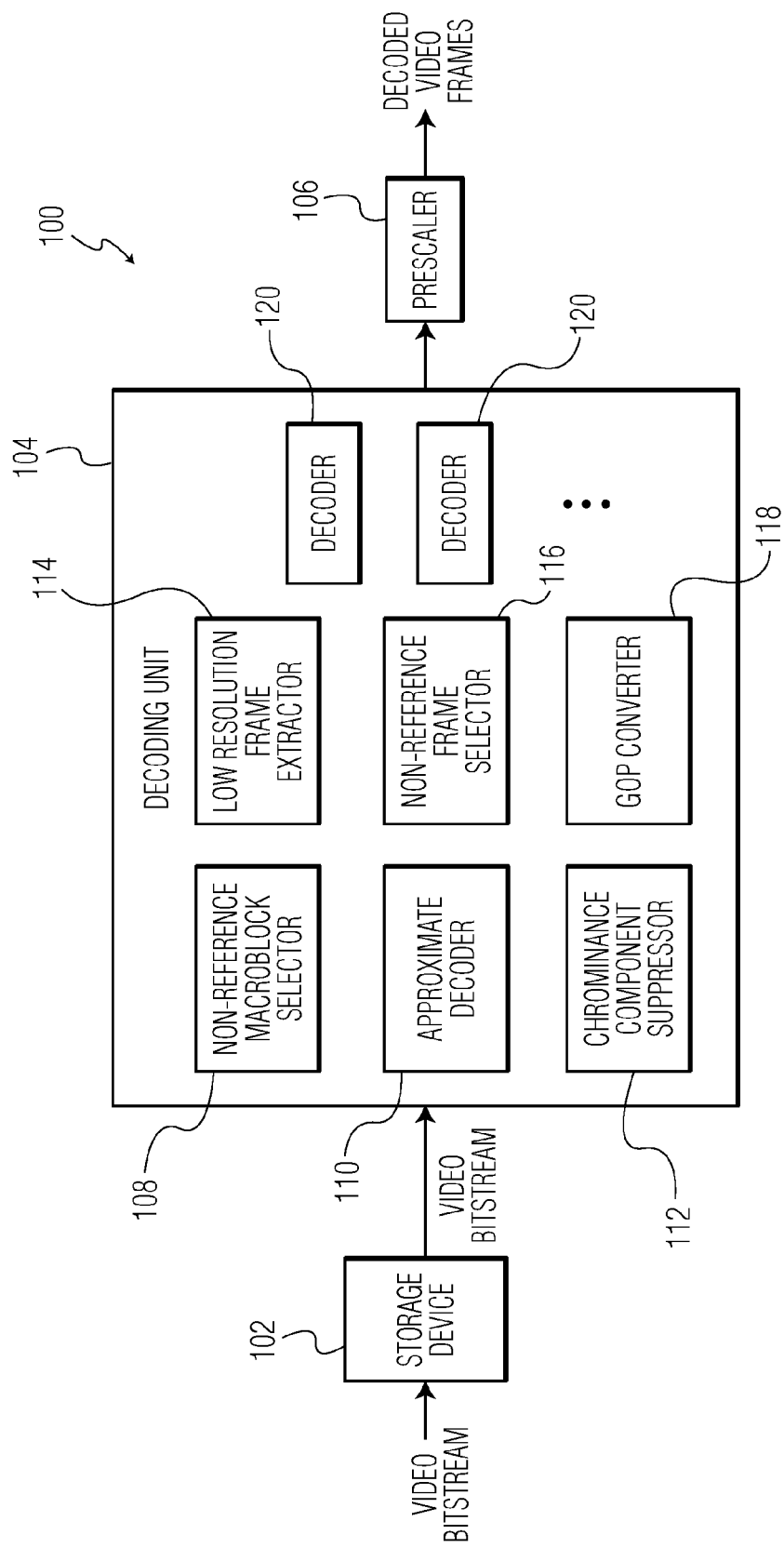
FIG. 1 is a block diagram of a system for providing trick modes in accordance with an embodiment of the invention.

With reference to FIG. 1, a system 100 for providing trick modes in accordance with an embodiment of the invention is described. As described in more detail below, the system 100 utilizes one or more decoding techniques to accelerate video decoding and to reduce memory requirement during one or more trick modes, which may include fast forward, rewind etc. Thus, the system 100 is able to provide high quality trick modes more quickly than comparable conventional systems that provide similar trick modes without increasing the computational requirements to process video bitstreams.

As illustrated in FIG. 1, the system 100 includes a storage device 102, a decoding unit 104 and an optional prescaler 106. The storage device 102 is used to store a video bitstream, which may have been encoded using any coding scheme. As an example, the video bitstream may be a video bitstream coded according to H.264 coding standard. The storage device 102 can be any type of memory, such as a computer hard disk drive device or a flash memory device.

The decoding unit 104 is connected to the storage device 102 to access the stored video bitstream for normal play mode, as well as for trick modes. During a normal play mode (1× speed), the decoding unit 104 decodes the video bitstream in a conventional manner to produce video frames to be displayed for normal play. During a trick mode, the decoding unit 104 processes the video bitstream to efficiently decode video frames to be displayed for the selected trick mode.

As shown in FIG. 1, the decoding unit 104 includes a non-reference macroblock selector 108, an approximate decoder 110, a chrominance component suppressor 112, a low resolution frame extractor 114, a non-reference frame selector 116, a group of pictures (GOP) converter 118 and one or more decoders 120. Although these components of the decoding unit 104 are shown in FIG. 1 as being separate components, some or all of these components may be integrated into fewer components, even into a single component. These components of the decoding unit 104 can be implemented as software, hardware, firmware, or in any combination of software, hardware and firmware.

The non-reference macroblock selector 108 operates to select macroblocks of particular frames of the video bitstream that do not have to be decoded during a selected trick mode. According to YCbCr 4:2:0 color format, a macroblock is a square region of 16×16 luminance pixels (Y), and a square region of 8×8 for each of the chrominance pixels (Cb and Cr). In trick modes, such as fast forward and rewind, coded frames of the video bitstream have to be decoded predictively. However, some of these frames are not displayed to achieve the desired trick mode speed. These predictive frames may be B frames (bidirectional coded frames) and/or P frames (predictive encoded frames) of the video bitstream. These predictive frames will be referred to therein as "dropped predictive frames." Some of the macroblocks of these dropped predictive frames do not act as reference regions for decoding future frames. Such non-reference macroblocks correspond to the regions which are moving out of the scene and will not be referred to in future frames. These macroblocks are detected by projecting the location of these macroblocks in the future frame. For example, a decoded motion vector is subtracted from the current location of the macroblock to find the location of the same macroblock in the future frame. This example of using subtraction assumes a constant velocity model and uniform temporal sampling of frames. Alternatively, a linear prediction model can be used to predict the location of the macroblock in future frames. If the macroblock is almost outside the future frame according to the new location of the macroblock, then the macroblock is not decoded since the macroblock will not be needed to decode future frames. The non-reference macroblock selector 108 is configured to determine which of the predictive frames of the video bitstream will be the dropped predictive frames and select the non-reference macroblocks in the dropped predictive frames that will not be decoded. Thus, when the dropped predictive frames are decoded, the macroblocks of these predictive frames will be decoded without decoding the selected non-reference macroblocks.

The approximate decoder 110 operates to identify some macroblocks of the frames (e.g., the B and P frames) of the video bitstream that can be approximately decoded. The approximate decoder decodes a approximate_decoding_user_data_header for a frame of the video bitstream. A video encoder/transcoder encodes this user data header into the video bitstream. The fields of this approximate_decoding_user_data_header include the following:

1. a chrominance bit;
2. an encoding mode of macroblock map;
3. the number of fixed bits, M bits, to be used for coding number of consecutive zeros;
4. the number of fixed bits, N bits, to be used for coding number of consecutive ones; and
5. a macroblock map.

The macroblock map is a bitmap which contains one bit per macroblock. This bit, coded as "0", indicates that the corresponding macroblock can be approximately decoded. Approximate decoding means fractional part of a motion vector is dropped and residual error for this block is not decoded. This macroblock map can be encoded in various ways. The encoding modes of macroblock map include:

1. a run-length encoding mode, i.e., runs of zeros and runs of ones. "Runs of zeros" is encoded as "0" followed by the number of consecutive zeros. "Runs of ones" is encoded as "1" followed by number of consecutive zeros. Consecutive zeros are encoded using M bits and consecutive ones are encoded using N bits.
2. a raw mode—one bit per macroblock is coded as is.

Figure 2:
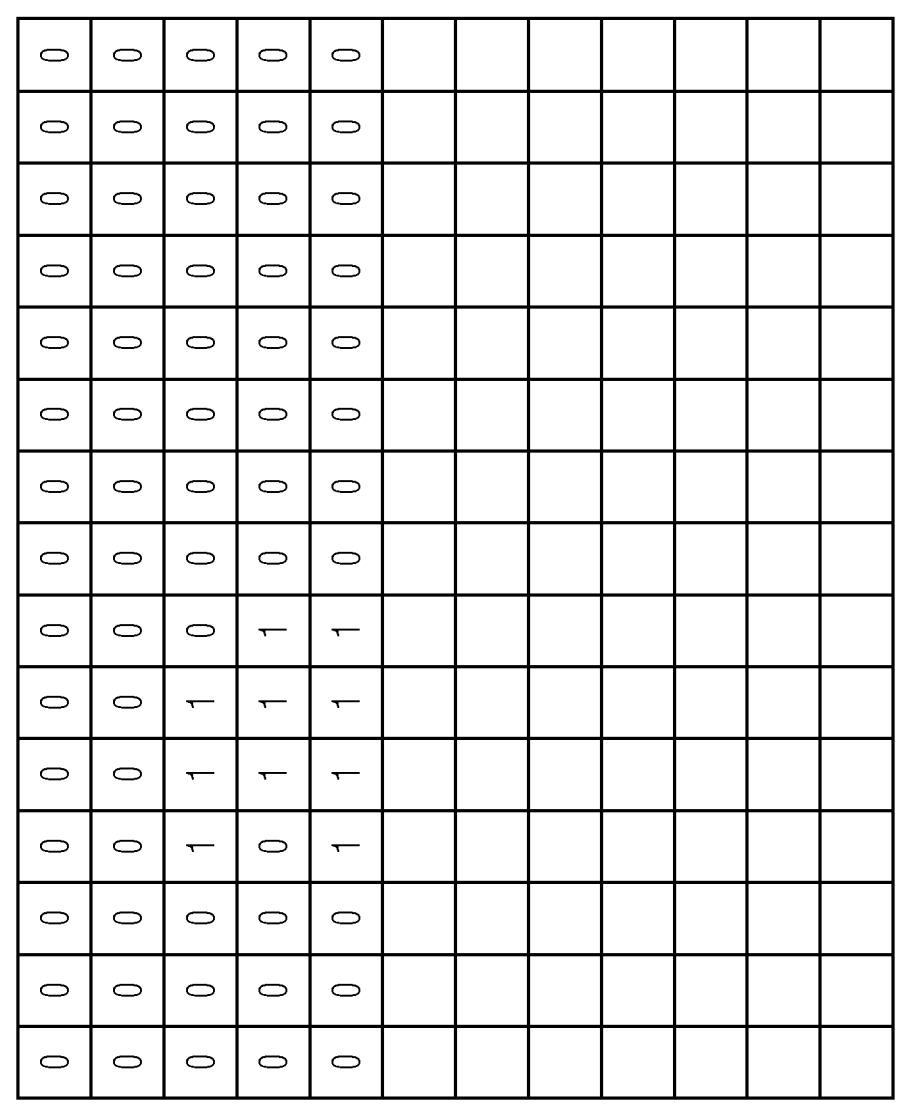

An example of a macroblock map is shown in FIG. 2. The macroblock map of FIG. 2 is encoded using run-length encoding as (0,33), (1,3), (0,13), (1,3), (0,11), (1,4), . . . , where the first number in each parenthesis is either "0" or "1" and the second number is the number of consecutive zeros or ones.

The chrominance bit indicates whether or not chrominance blocks are to be decoded for these macroblocks. If the chrominance bit is "0", then chrominance blocks are not reconstructed for the macroblocks that are approximately decoded.

Macroblocks of a video frame can be categorized as belonging to the background or the foreground of the video content. Approximate decoding is generally performed for the macroblocks that belong to the background. Users are generally more interested in the foreground macroblocks than the background macroblocks. This is also true for fast forward and rewind trick modes, during which the users tend to be more interested in the foreground macroblocks. Thus, the background macroblocks can be approximately decoded without much notice by the users. The macroblock map described above can be used to specify which are background and foreground macroblocks. The macroblocks which are to be decoded approximately become the background macroblocks. Alternatively, a decoder can automatically decide between foreground/background macroblocks, for example, by extracting this information from the motion vector distribution. Global Motion Vector (GMV) generally estimates the motion of camera. The macroblocks having motion vector close to GMV are declared as background macroblocks. There are various other known methods available in literature for identifying foreground and background macroblocks.

The chrominance component suppressor 112 operates to suppress the chrominance components, Cb, Cr, of the video frames to be decoded so that the chrominance components are not decoded and only the luminance components, Y, are decoded for these video frames. Users are generally interested in correct display speed and approximate location of scene content during trick modes. Thus, the lack of chrominance components during trick modes is tolerable. The chrominance components not being decoded results in computation and memory savings. According to the YCbCr 4:2:0 color format, Cb frame (Chrominance) is ¼ of Y frame (Luminance) and Cr frame (Chrominance) is ¼ of the Y frame. Thus, for the YCbCr 4:2:0 color format, memory savings are of the order of 33%. These savings in computation and memory are relatively more beneficial in a rewind operation.

The low resolution frame extractor 114 operates to obtain a lower resolution version of the video bitstream since lower resolution frames require fewer computations for decoding and less memory for storing decoded frames. The lower resolution frames are extracted from the high resolution video frames of the video bitstream. The lower resolution video frames can then be scaled by the prescaler 106 to match the resolution of a display device (not shown). The lower resolution frames can be extracted directly or indirectly from the video bitstream. If the lower resolution frames are decoded directly from the video bitstream, then significant computation and memory savings can be achieved. Once the lower resolution frames are obtained, these lower resolution frames are decoded rather than the original high resolution frames to reduce the number of computations performed for decoding. The lower resolution frames can be obtained indirectly from the video bitstream by decoding the high resolution frames followed by filtering and subsampling of the high resolution video frames. If the lower resolution frames are obtained indirectly from the video bitstream, then significant memory savings can be achieved.

If the video bitstream is hierarchically coded, then only the lower resolution bitstream can be decoded. Otherwise, the lower resolution video frames can be obtained from the high resolution video bitstream.

The non-reference frame selector 116 operates to select only those non-reference frames (e.g., non-reference B and P frames) of the video bitstream that are required to achieve the desired speed of a selected trick mode, such as fast forward or rewind. Thus, only the required non-reference frames of the video bitstream are decoded and displayed. If the non-reference frames that will not be displayed are not decoded, then a high decode rate can be more easily achieved to maintain a uniform (smooth) high speed trick mode. It can be predicted if a particular B frame (a frame which will not act as a reference frame for decoding other frames) will get displayed or not during a trick mode. If a particular B frame will not be displayed, then this frame is not decoded. These unneeded B frames are dropped, which increase the decode rate. Since none of the non-reference frames that will be displayed is dropped, the frames to be displayed are not compromised and a uniform display rate as per the desired trick mode speed can be obtained.

One way of dropping the unneeded non-reference frames is by adjusting the updation of STC (system time clock) according to the required trick mode speed. If a trick mode speed of 3× (thrice the normal speed) is required, then the STC increments can be multiplied by a factor of three. If the PTS (presentation time stamp) of a frame is less than the lower limit of PTS synchronization window, then the frame can be declared as late and thrown away before display. Decision of whether to display a frame or not is based on comparing the PTS of the frame with the STC. Instead of comparing the PTS of a frame with a single value of STC, a time window is defined to account for various practical system latencies in displaying a frame. If PTS <(STC−pts_upper_bound), then the frame is declared as late and is not displayed. Time between "STC−pts_lower_bound" and "STC−pts_upper_bound" is defined as the PTS_Sync_Window, and thus, pts_lower_bound and pts_upper_bound are used to control the PTS_Sync_Window, where pts_upper_bound is generally a positive value and pts_lower_bound is generally a negative value. Lower limit of PTS synchronization window=STC−pts_upper_bound.

In contrast, the non-reference frame selector predicts if the PTS of a non-reference frame will lie within the PTS sync window. Instead of dropping the non-reference frame at display time, the non-reference frame selector 116 makes the decision of dropping the non-reference frame at the decode time, i.e., before decoding, and thus, avoids decoding the non reference frame which will not be displayed. If the DTS (decode time stamp) of a non-reference frame is less than the lower limit of DTS synchronization window, then that frame is declared as late and is not decoded. Decision of whether to decode a frame or not is based on comparing the DTS of the frame with the STC. Instead of comparing the DTS of a frame with a single value of STC, a time window is defined to account for various practical system latencies in decoding a frame. If DTS <(STC−dts_upper_bound), then the frame is declared as late and is not decoded. Time between "STC−dts_lower_bound" and "STC−dts_upper_bound" is defined as the DTS_Sync_Window, and thus, dts_lower_bound and dts_upper_bound are used to control the DTS_Sync_Window, where dts_upper_bound is generally a positive value and dts_lower_bound is generally a negative value. Lower limit of DTS synchronization window=STC−dts_upper_bound.

The GOP converter 118 operates to convert large GOPs of the video bitstream into smaller sub-GOPs to reduce the memory requirement to provide trick modes, in particular the reverse playback. A larger GOP having reference frames more than the available memory requires either more memory to store all the decoded frames or some of the frames which get thrown away because of replacement by most recent decoded frames must be re-decoded. The GOP converter 118 forms smaller sub-GOPs from a larger GOP, which reduces the memory requirement for reverse playback.

Reverse playback for forward coded video bitstream is implemented by fetching the GOPs from the storage device 102 in reverse direction. Each GOP is then forward decoded and the decoded frames are displayed in reverse direction. As an example, the following is a sequence stored in the storage device: GOP1 GOP2 GOP3 GOP4 GOP5 GOP6 GOP7. In addition, the following is the decoding order of frames in GOP7: I1 P2 B3 B4 P3 B5 B6 P4 B7 B8 P5 B9 B10. In reverse playback, the following will be the fetch order of GOPs when reverse playback was requested at GOP7: GOP7 GOP6 GOP5 GOP4 GOP3 GOP2 GOP1. The following will be the display order of the decoded frames of GOP7 in reverse playback: P5 B10 B9 P4 B8 B7 P3 B6 B5 P2 B4 B3 I1.

Conversion of large GOPs into sub-GOPs can be done on the fly or off-line and during normal/forward/reverse playback. Video bitstream is generally reverse played after the video bitstream has been decoded in a forward direction till a certain point. Hence, in most of the cases, large GOPs would have been converted to smaller sub-GOPs before a rewind operation is invoked.

Let the following be the sequence of frames in a large GOP: I1 P2 P3 P4 P5 P6 P7 P8 P9 P10 P11 P12 P13 P14 P15 P16 P17 P18 P19 P20. GOP structure is generally available beforehand. If the GOP is large, the GOP converter 118 decides beforehand how many sub-GOPs will be created out of the large GOP under the constraint of limited frame buffer memory. Alternatively, if only few frame buffers are left, say two, and the remaining GOP to be decoded is bigger than the few frame buffers left, the GOP converter selects the oldest available decoded reference frame, such as P frame, as the first key frame of the sub-GOP. Number of frames present between I frame of a large GOP and key frame of a sub-GOP defines the size of the sub-GOP. Key frames for the subsequent sub-GOPs are located at integer multiples of this sub-GOP size, but if the remaining number of frames of a the large GOP become less than the sub-GOP size then a reference frame which is located midway between "current decoded sub-GOP reference frames+remaining reference frames of large GOP" is selected as the key frame. These new sub-GOPs are either encoded as open GOPs or closed GOPs. Closed GOP is defined as a GOP whose frames are not dependent on the reference frames of other GOPs, whereas in open GOP, one or more frames of the open GOP may be dependent on the reference frames of other GOPs. If the new sub-GOP is to be encoded as a closed GOP, then the GOP converter encodes the key frame of the sub-GOP as I frame. This reference frame, such as P frame, encoded as I frame marks the beginning of the new sub-GOP which is formed from the frames of the large GOP. If this sub-GOP is to be encoded as an open GOP, then the key frame of the sub-GOP is encoded with respect to the key frames of the preceding sub-GOPs. Key frame of an open GOP can be encoded as a frame of any predictive type. This process is repeated till the remaining reference frames of the large GOP are less than or equal to the selected sub-GOP size. The key frame of the first sub-GOP is the original I frame of the large GOP. According to H.264, the key frames of open sub-GOPs get encoded as long term reference frames. Long term reference frames are the frames which act as reference frames for decoding of frames which are located at large temporal distances with respect to the long term reference frame.

If the video bitstream is being encoded according to video coding standard which does not support long term reference frames, then a user data header, Key_Frame_User_Data_Header, is provided before the key frame, which indicates that this key frame will be referred by a future key frame and indicates which previous key frame will be used as reference to decode this key frame. The Key_Frame_User_Data_Header includes a unique identifier, such as a unique start code. This identifier will be unique in the entire video bitstream. When the video bitstream is being decoded, the unique identifier will indicate the start of the Key_Frame_User_Data_Header. When the video bitstream is being decoded, a record of key frames of the GOP is maintained so that the previous key frame can be made available as a reference frame to decode current key frame.

The above large GOP with the frame sequence of I1 P2 P3 P4 P5 P6 P7 P8 P9 P10 P11 P12 P13 P14 P15 P16 P17 P18 P19 P20 will be converted to three sub-GOPs having the following frame sequence: I1 P2 P3 P4 P5 P6 P7 P8 I9 P10 P11 P12 P13 P14 I15 P16 P17 P18 P19 P20. The frames I1, I9 and I15 are the key frames of the sub-GOPs. The frames I1 P2 P3 P4 P5 P6 P7 P8 form the first sub-GOP, the frames I9 P10 P11 P12 P13 P14 form the second sub-GOP and the frames I15 P16 P17 P18 P19 P20 form the third sub-GOP. A use case of particular interest is conversion of a large GOP into smaller Sub-GOPs during a rewind operation. In this case the converted large GOP will look like the following: I1 P2 P3 P4 P5 P6 P7 P8 K9 P10 P11 P12 P13 P14 P15 P16 P17 P18 P19 P20, where K9 is a decoded reference frame. In this use case, if the remaining reference frames of the large GOP are less than the sub-GOP size, then no new key frame is selected. In an embodiment of the invention, in this use case, the decoded reference frame K9 may not be compressed and may be retained as a decoded frame. In this embodiment, selected key frames of the sub-GOPs may not be compressed and are retained as is.

The predictive frames (e.g., P frames) of these new sub-GOPs can be re-encoded at a lower quality if the converted large GOP is not being stored back in the storage device 102. In addition, the predictive frames of the sub-GOPs are re-encoded only if the key frames of the sub-GOPs are re-encoded using lossy compression techniques. Encoding decisions which are decoded from the original video bitstream can be used to re-encode the new sub-GOPs at the lowest possible encoding computation. Conversion of large GOPs into smaller sub-GOPs at lower quality minimizes the encoding computational load. Lower quality is achieved by discarding the fractional part of motion vectors and using integer part of original motion vectors to obtain new residual error, which is then quantized, transformed and entropy coded.

The decoders 120 operate to decode the necessary parts of the video bitstream to produce the video frames to be displayed for a selected trick mode. One or more of these decoders 120 may also perform approximate decoding. The types of decoders included in the decoding unit 104 depend on the codec format(s) of the video bitstream being decoded. As an example, if the original video bitstream is a video bitstream according to H.264 standard, then one of the decoders 120 is a H.264 decoder. However, different types of decoders may be included in the decoding unit 120.

In operation, an original video bitstream is received and stored in the storage device 102. The decoding unit 104 then accesses the video bitstream stored in the storage device 102 to process the video bitstream to produce the video frames to be displayed for a normal play or a trick mode play. The non-reference macroblock selector 108, the approximate decoder 110, the chrominance component suppressor 112, the low resolution frame extractor 114, the non-reference frame selector 116, the group of pictures (GOP) converter 118 and the decoders 120 performs the above-described operation so that the decoding unit 104 can efficiently decode the video bitstream during a selected trick mode to provide the video frames to be displayed for the selected trick mode.

Figure 3:
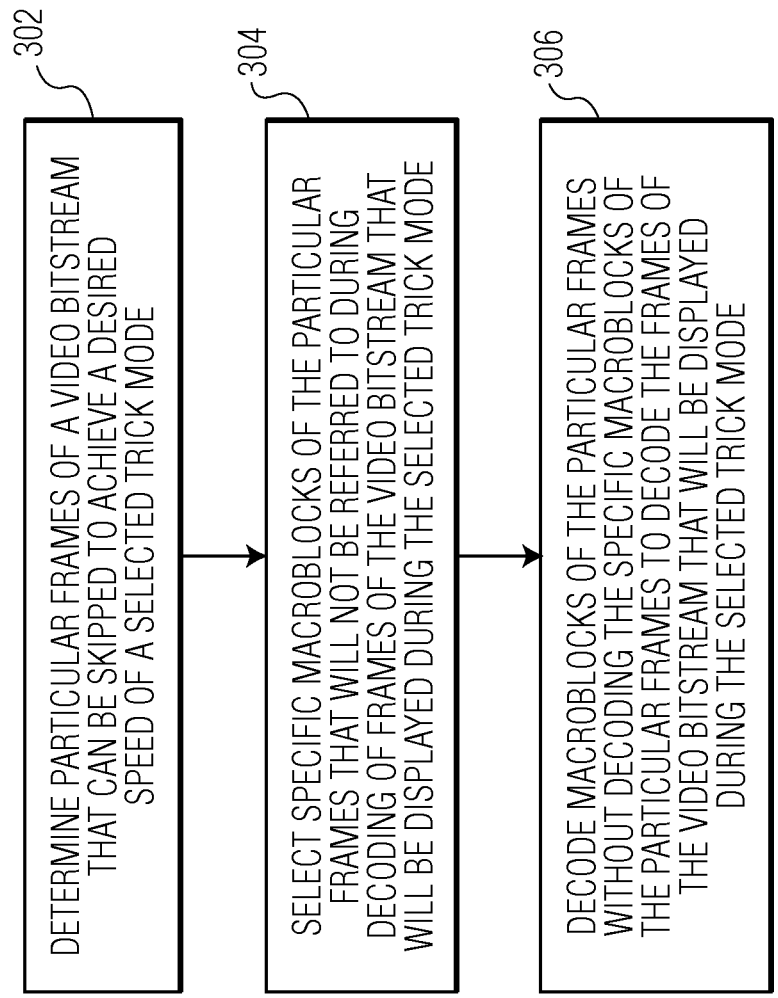
FIG. 3 is a process flow diagram of a method for providing trick modes in accordance with an embodiment of the invention.

A method for providing trick modes in accordance with an embodiment of the invention is described with reference to a process flow diagram of FIG. 3. At block 302, particular frames of a video bitstream that can be skipped to achieve a desired speed of a selected trick mode are determined. Next at block 304, specific macroblocks of the particular frames that will not be referred to during decoding of frames of the video bitstream that will be displayed during the selected trick mode are selected. Next, at block 306, macroblocks of the particular frames are decoded without decoding the specific macroblocks of the particular frames to decode the frames of the video bitstream that will be displayed during the selected trick mode.

Figure 4:
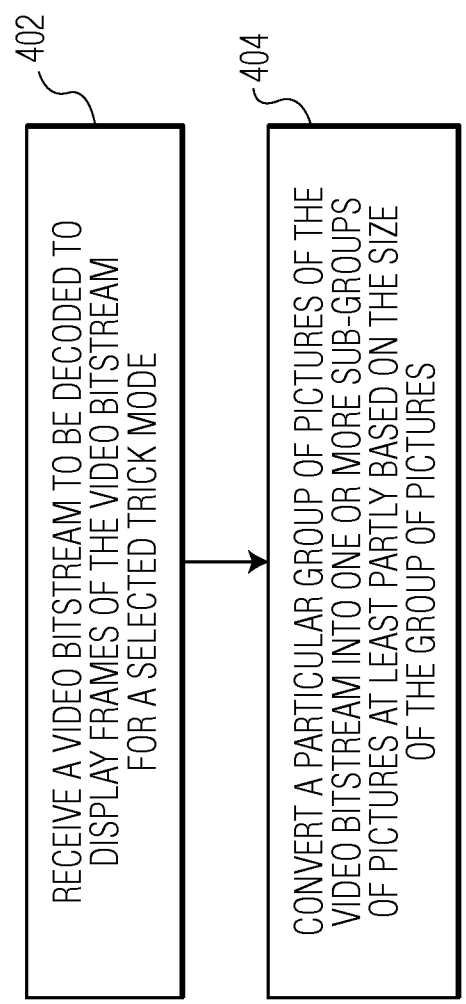
FIG. 4 is a process flow diagram of a method for providing trick modes in accordance with another embodiment of the invention.

A method for providing trick modes in accordance with another embodiment of the invention is described with reference to a process flow diagram of FIG. 4. At block 402, a video bitstream to be decoded to display frames of the video bitstream for a selected trick mode is received. The video bitstream includes groups of pictures. Next, at block 404, a particular group of pictures of the video bitstream is converted into one or more sub-groups of pictures at least partly based on the size of the group of pictures, wherein each of the sub-groups of pictures includes fewer frames than the particular group of pictures.

Although the operations of the methods herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for providing trick modes, the method comprising:
   determining particular frames of a video bitstream that can be skipped to achieve a desired speed of a selected trick mode;
   selecting specific macroblocks of the particular frames that will not be referred to during decoding of frames of the video bitstream that will be displayed during the selected trick mode;
   decoding macroblocks of the particular frames without decoding the specific macroblocks of the particular frames to decode the frames of the video bitstream that will be displayed during the selected trick mode; and
   selecting macroblocks of frames of the video bitstream that can be approximately decoded such that fractional part of a motion vector of a selected macroblock is dropped, chrominance components are not decoded and residual error for the selected block is not decoded.

2. The method of claim 1 further comprising suppressing decoding of chrominance components of the frames of the video bitstream that are to be decoded so that only the luminance components are decoded for these frames.

3. The method of claim 1 further comprising obtaining a lower resolution version of the frames of the video bitstream that are to be decoded so that the frames in the lower resolution version are decoded rather than the frames in an original resolution or downscaling high resolution decoded frames of the video bitstream and scaling these frames back to match the display resolution.

4. The method of claim 1 further comprising selecting non-reference frames of the video bitstream to be dropped before decoding, the selecting the non-reference frames including determining whether a decode time stamp of each of the non-reference frames is less than the lower limit of a decode time stamp synchronization window to drop such non-reference frames.

5. The method of claim 1 further comprising converting a group of pictures of the video bitstream into one or more sub-groups of pictures at least partly based on the size of the group of pictures.

6. The method of claim 5 wherein the converting includes selecting the decoded reference frame of the group of pictures located just after an integer multiple of the sub-groups of pictures as the first key frame of a sub-group of pictures.

7. The method of claim 5 wherein the converting includes encoding the sub-groups of pictures as open or closed groups of pictures such that a key frame of a closed sub-group of pictures is not compressed or is encoded as an intra coded frame and a key frame of an open sub-group of pictures is encoded as a predictive frame which is dependent on the key frames of preceding sub-group of pictures.

8. A system for providing trick modes comprising:
   a storage device to store a video bitstream;
   a decoder unit connected to the storage device to receive and process the video bitstream to decode the video bitstream to produce frames to be displayed, the decoder unit including a non-reference macroblock selector configured to determine particular frames of the video bitstream that can be skipped to achieve a desired speed of a selected trick mode, the non-reference macroblock selector being further configured to select specific macroblocks of the particular frames that will not be referred to during decoding of the frames of the video bitstream that will be displayed during the selected trick mode, the decoder unit being configured to decode at least some macroblocks of the particular frames without decoding the specific macroblocks of the particular frames to decode the frames of the video bitstream that will be displayed during the selected trick mode; and
   an approximate decoder configured to select macroblocks of the frames of the video bitstream that can be approximately decoded such that fractional part of a motion vector of a selected macroblock is dropped, chrominance components are not decoded and residual error for the selected block is not decoded.

9. The system of claim 8 wherein the decoding unit further includes a chrominance component suppressor configured to suppress decoding of chrominance components of the frames of the video bitstream that are to be decoded so that only the luminance components are decoded for these frames.

10. The system of claim 8 wherein the decoding unit further includes a low resolution frame extractor configured to obtain a lower resolution version of the frames of the video bitstream that are to be decoded so that the frames in the lower resolution version are decoded rather than the frames in an original resolution or downscaling high resolution decoded frames of the video bitstream and scaling these frames back to match the display resolution.

11. The system of claim 8 wherein the decoding unit further includes a non-reference frame selector configured to select non-reference frames of the video bitstream to be dropped before decoding, the non-reference frame selector being further configured to determine whether a decode time stamp of each of the non-reference frames is less than the lower limit of a decode time stamp synchronization window to drop such non-reference frames.

12. The system of claim 8 wherein the decoding unit further includes a group of pictures converter configured to convert a group of pictures of the video bitstream into one or more sub-groups of pictures at least partly based on the size of the group of pictures.

13. The system of claim 12 wherein the group of pictures converter is configured to select the decoded reference frame of the group of pictures located just after an integer multiple of the sub-groups of pictures as the first key frame of a sub-group of pictures.

14. The system of claim 12 wherein the group of pictures converter is configured to encode the sub-groups of pictures as open or closed groups of pictures such that a key frame of a closed sub-group of pictures is not compressed or is encoded as an intra coded frame and a key frame of an open sub-group of pictures is encoded as a predictive frame which is dependent on the key frames of a preceding sub-group of pictures.

\* \* \* \* \*